Figure 1:
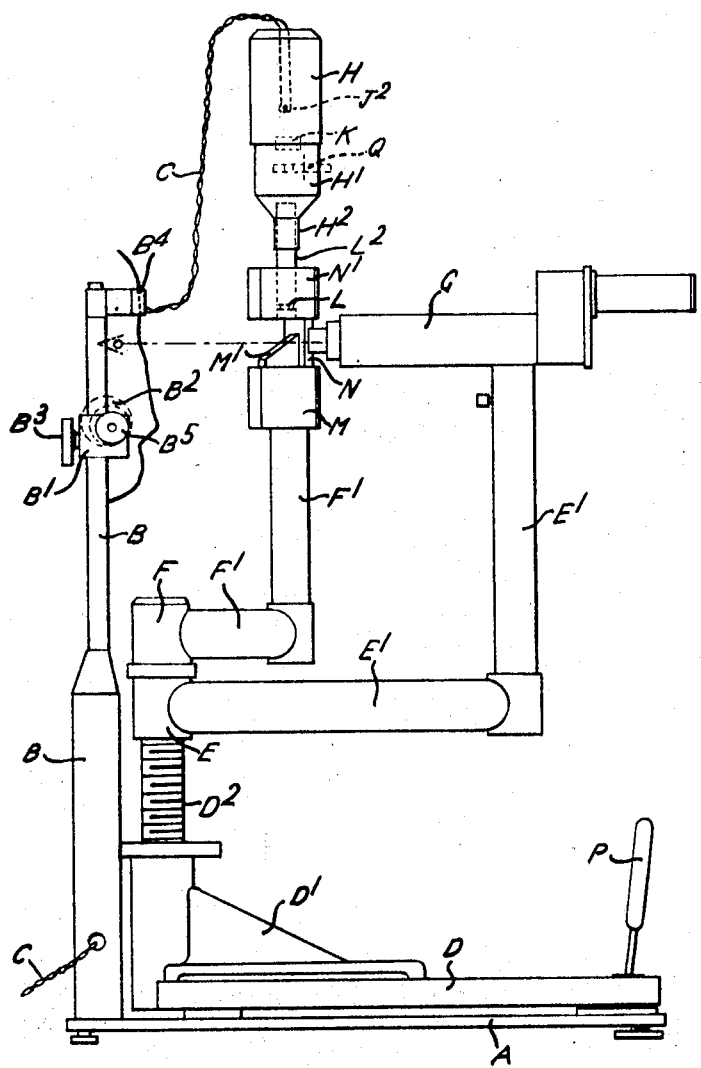

Inventors
H.C. Binstead
G.E. Rondeau

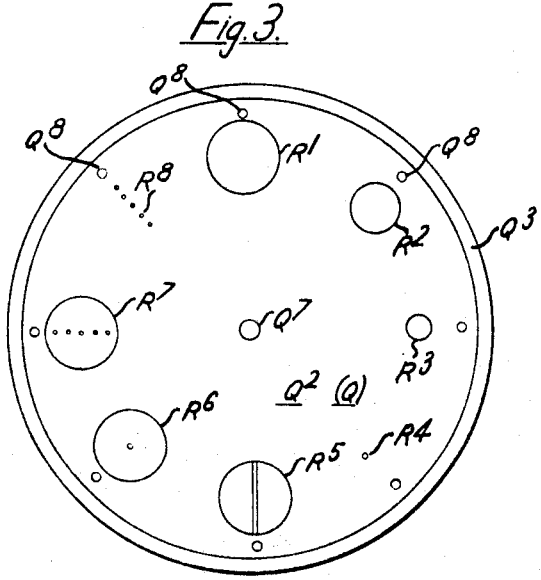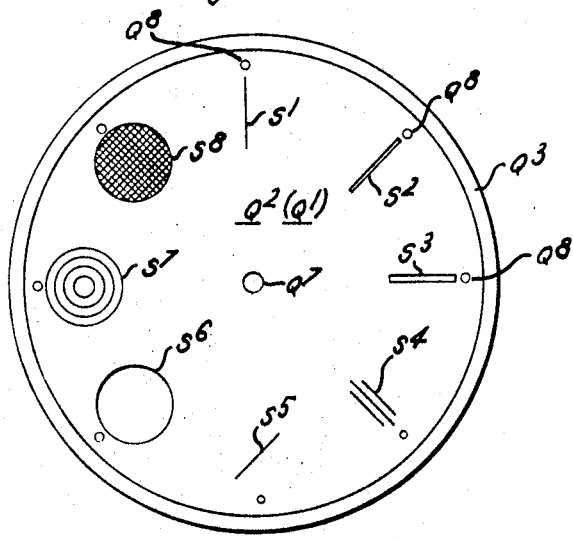

INVENTORS
HUGH CECIL BINSTEAD
BY GEORGE EDGAR RONDEAU
ATTORNEYS

United States Patent Office
3,467,466
Patented Sept. 16, 1969

3,467,466
OPTICAL APPARATUS FOR THE EXAMINATION OF THE HUMAN EYE
Hugh Cecil Binstead, Harlow, Essex, and George Edgar Rondeau, London, England, assignors to United Kingdom Optical Company Limited, London, England, a company of Great Britain
Filed Nov. 4, 1964, Ser. No. 408,787
Int. Cl. A61b 3/12
U.S. Cl. 351—14                                                4 Claims This invention relates to optical apparatus for the examination of the human eye, of the kind commonly known as slit lamp apparatus comprising illuminating means for focussing a beam of light on the eye to be examined and a microscope for viewing the illuminated eye, such illuminating means and such microscope being mounted for independent movement to permit the eye to be illuminated and viewed along various directions.

In known slit lamp apparatus, the illuminating means consists of a mechanically formed slit or other aperture, a source of light illuminating such aperture and an optical objective for focussing an image of the illuminated aperture on the eye to be examined. The usual mechanical methods of producing the aperture elements result in slight irregularities at the aperture edges, and while these irregularities have been fully tolerated since they do not interfere with normal examination processes, nevertheless such irregularities, which result in a slight lack of sharpness at the edges of the illuminating beam, can be disadvantageous when highly accurate observation is to be carried out with a high magnification microscope. Furthermore, it is desirable in slit lamp apparatus to provide a number of varying aperture shapes suited to various ophthalmic tests. Known slit lamp apparatus provides for a slit adjustable in width or a number of slits of varying widths and also one or more pinholes for selective use as the aperture, the change from one aperture shape to another being effected by relative displacement of two or more aperture-defining elements. Practical considerations severely limit the number of different aperture shapes which may be provided in this way, and at the same time render it difficult precisely to predetermine the shape, size and position of each of the various apertures which may be obtained.

The object of the present invention is to provide slit lamp apparatus enabling the above-described disadvantages of the known apparatus to be substantially avoided or at least appreciably minimised.

According to one feature of the present invention, optical slit lamp apparatus for the examination of the human eye comprises means for illuminating an object position at which the eye is located and including a graticule having areas of differing light-transmitting quality, a source of light for illuminating the graticule and an optical objective for focussing an image of the graticule on the object position, a microscope for observing the object position, and means for mounting the illuminating means and the microscope to permit each to move independently of the other, whereby the eye in the object position can be illuminated and viewed along various directions, the graticule consisting of a photograph of a master graticule pattern.

With this arrangement, a master graticule pattern of extremely high quality may be produced and used to enable any number of slit lamp graticules to be produced wherein the boundaries between the areas of differing light-transmitting quality are sharply and precisely defined, even when viewed as images through the slit lamp microscope. Preferably however, the graticule consists of a photograph at an appreciably reduced scale of a relatively large master graticule pattern. In this way, lack of sharpness at the edges of the master graticule pattern is correspondingly reduced in the actual graticule incorporated in the slit lamp.

The arrangement readily permits the use of a large number of interchangeable differing graticules, being for example either photographs of differing master graticule patterns or photographs of the same master graticule pattern in differing orientations or positions. With any of such interchangeable graticules, the shape, size and position of the areas of differing light-transmitting quality is predetermined in the production of the photograph.

According to a second feature of the present invention, optical slit lamp apparatus for the examination of the human eye comprises means for illuminating an object position at which the eye is located and including a carrier for locating in an operative position a graticule having areas of differing light-transmitting quality, a source of light for illuminating the graticule and an optical objective for focussing an image of the graticule on the object position, a microscope for observing the object position, and means for mounting the illuminating means and the microscope to permit each to move independently of the other, whereby the eye in the object position can be illuminated and viewed along various directions, the carrier supporting a number of differing photographically produced graticules and being mounted for movement so that any chosen graticule can be brought into the operative position in which its image is focussed on the object position.

A preferred arrangement of slit lamp apparatus includes two (or more) carriers each supporting a number of differing photographically produced graticules, the arrangement being such that two or more of such graticules, one on each carrier, may be rendered operative simultaneously. The shape of the aperture limiting the illuminating beam may thus be determined by the two (or more) operative graticules in combination.

The carrier, or each carrier, may conveniently consist of a rotatable disc bearing the differing graticules in spaced angular positions thereon.

In the preferred arrangement, at least one of the graticule positions on each carrier is occupied by a light-transmitting aperture of a sufficient size to transmit substantially all the useful light from the source. With one carrier located with this aperture in the operative position, any one of the graticules or the other carrier (or carriers) may be located in the operative position to determine the aperture shape.

At least one of the graticules supported by the carrier or by one of the carriers may consist for example of a light-transmitting slit of predetermined width or of a number of light-transmitting slits arranged in a predetermined pattern or of an opaque spot with a light-transmitting surround. Usually the carrier or carriers will support at least one graticule arranged in each of these ways.

Figure 2:
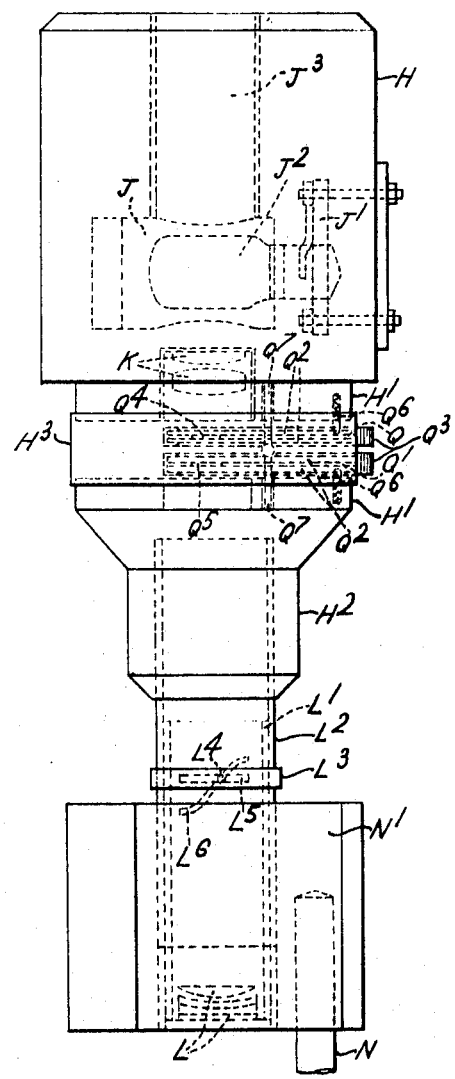
Figure 5:
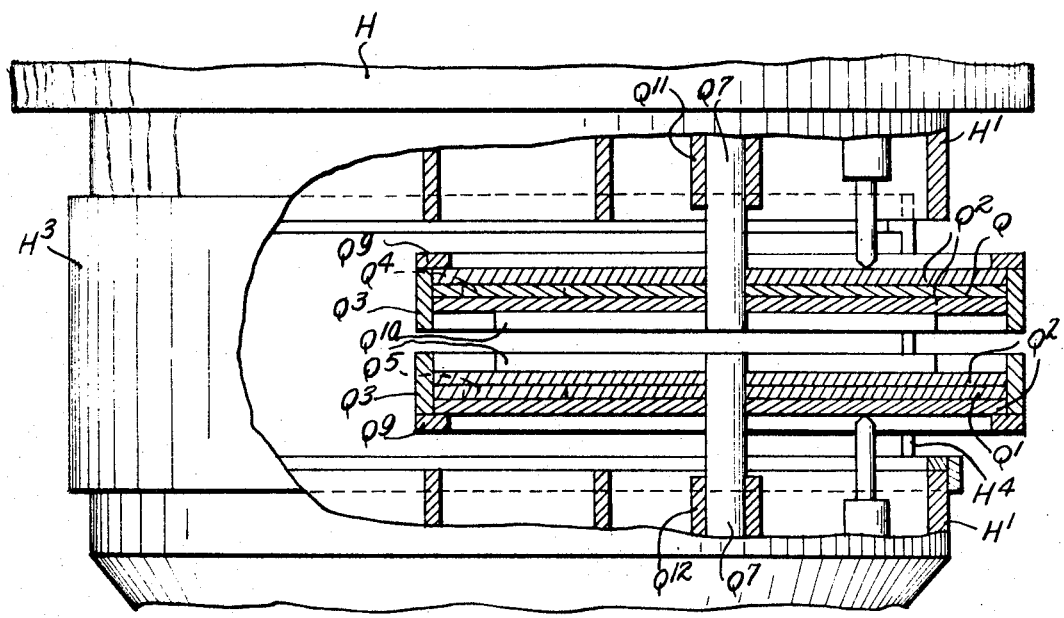

Further features of the invention will be apparent from the preferred practical arrangement of slit lamp apparatus now to be described by way of example with reference to the accompanying drawings, in which:

FIGURE 1 is a side elevational view of the preferred arrangement of complete slit-lamp apparatus, FIGURE 2 is an enlarged somewhat diagrammatic side elevational view of the illuminating means employed in such arrangement, FIGURES 3 and 4 are further enlarged plan views respectively of two practical arrangements of graticule carrier employed in the illuminating means, and FIGURE 5 shows part of FIGURE 2 on a much enlarged scale, the casing being broken away to show the parts within it in sectional view.

In this preferred slit lamp arrangement, a lower base plate A carries a suitable support for the patient's head, so that the eye to be examined is properly located in the object position of the apparatus. For example, such cheek support may take the form of the cheek support indicated in FIGURE 1. Upstanding from the lower base plate A, respectively adjacent to the rear corners thereof, are a pair of vertical support rods B laterally spaced apart by a distance somewhat greater than the average width of the human head. Mounted for vertical and angular adjustment on the respective support rods B are a pair of supporting members $B^1$ each carrying a relatively hard cheek pad $B^2$. Means in the form of a clamping screw $B^3$ are provided for clamping each supporting member $B^1$ to its support rod B in the chosen position of adjustment. Each cheek pad $B^2$ is mounted on its supporting member $B^1$ by means of a universal joint, thereby permitting such pad a freedom of orientation within a limited range, but the operative faces of such pads, which conveniently are each convexly curved, in use generally face largely towards one another but partly upwardly and partly rearwardly. The two supporting members $B^1$ are normally adjusted to locate the cheek pads $B^2$ inwardly of the two vertical support rods B, so that when such supporting members are clamped in position at the same level, the horizontal spacing between the centres of the operative faces of such pads is approximately equal to the mean separation of the lower edges of the cheek bones of the head. Across the top of the vertical support rods B extends a generally horizontal cross-piece $B^4$ constituting a forehead rest.

In use of the above-described head support (see FIGURE 1), the subject is normally seated at a table on which the slit lamp apparatus is stood, and the subject's head is supported by the engagement of the cheek pads $B^2$ with the undersides of the cheek bones, a third locating point being afforded by engagement of the forehead rest $B^4$ with the forehead when the height of the pad supporting members $B^1$ is correctly adjusted. The universal joints on which the pads $B^2$ are mounted provide for sufficient self-adjustment of the orientations of such pads to deal with variations in face contour. When the head is thus supported, the eye to be examined is automatically located substantially at the object position.

The action of the head support generally simulates the natural support provided by resting the cheek bones on the back of the fists with the elbows resting on a table. This natural position is further simulated by providing, on the vertical support rods B in the region of the cheek pads $B^2$ (and preferably as shown on the supporting members $B^1$ for movement therewith on the support rods B), elements $B^5$ which may be gripped by the subject with the hands. This assists the subject in maintaining the head position with comfort.

The vertical supports B may conveniently be made hollow so that at least one of them may be used as a conduit through which is passed the electrical supply cable C to illuminating means to be later described.

Vertically beneath the above-described object position, an upper base plate D carries a mounting $D^1$ for a vertical spindle $D^2$ carrying two concentric sleeves E and F, one such sleeve E being provided with a bracket $E^1$ carrying a microscope G and the other sleeve F being provided with a bracket $F^1$ carrying the illuminating means. The two sleeves E and F are independently rotatable about the spindle $D^2$, but each is provided with means (not shown) for clamping it to the spindle in any chosen angular position, and a further clamp (not shown) is provided for locking the two sleeves together so that the microscope G and the illuminating means can be rotated as a unit about the spindle.

The microscope bracket $E^1$ extends outwardly from its supporting sleeve E and then upwardly to support the microscope G at the level of the object position, the optical axis of the microscope being approximately horizontal.

The microscope may be of conventional construction for a slit lamp, being provided with means for focussing on to any desired point of the patient's eye in the object position. The bracket $F^1$ for the illuminating means also extends outwardly from its supporting sleeve and then upwardly to support the illuminating means above the level of the object position, the optical axis of such illuminating means being generally vertical. Such illuminating means (see FIGURE 2) includes a generally cylindrical casing formed in three parts, an upper part H, an intermediate part $H^1$ and a lower part $H^2$. The casing upper part H encloses a lamp housing J and lamp holder $J^1$ for a lamp $J^2$, together with a lamp chimney $J^3$. Below the source of light constituted by the lamp $J^2$, condensing lenses K are clamped in position between the casing upper part H and the casing intermediate part $H^1$, for concentrating the light from the source on an optical objective L. As later described, the casing intermediate part $H^1$ accommodates means for providing an aperture suited to the particular form of illumination required. Extending downwardly from the casing lower part $H^2$ is a fixed outer tube $L^2$ within which an inner tube $L^1$ carrying at its lower end the objective L, is axially movable, along the optical axis, to effect focusing. For example, by means of a focussing ring $L^3$, carrying a pin $L^4$ cooperating through a circumferential slot $L^5$ in the fixed tube with a helical slot $L^6$ in the movable tube, the desired movement of the objective L for focussing purposes may be effected. In this way an image of the aperture is formed at the patient's eye in line with the common axis of the rotatable concentric sleeves E and F respectively carrying the microscope G and the illuminating means. Thus, below the objective L the supporting bracket $F^1$ for the illuminating means carries on a platform M a small inclined reflector $M^1$ for deflecting the illuminating rays from the objective L to the chosen point of the patient's eye. The illuminating means is carried on this platform M by means of a short upstanding stem N which supports a hollow block $N^1$ within which is fixed the outer tube $L^2$ forming part of the objective mount, this tube in turn supporting above it the three part casing of the illuminating means. The arrangement is such that the reflector $M^1$ lies as close as possible to the path of movement of the microscope G around the axis of rotation, both without fouling and without blocking the view through such microscope. This may be achieved in a variety of ways known in the art. In the case of a binocular microscope, the reflector is preferably fully reflecting and located at 45 degrees to the horizontal so that it may be positioned on the bisector of the binocular axes. In the case of a monocular microscope, a 45 degree semi-reflector is preferably employed, so that it may be positioned on the monocular axis, but alternatively the reflector may again be fully reflecting, being locatable just above or just below the microscope level at an angle slightly differing from 45 degrees.

As above mentioned, the patient's eye is located at the object position by means of the head supporting means. However, for transferring the object position from one part of the eye to another part thereof or from one eye to the other eye, a control lever P is provided for laterally displacing the upper base plate D, carrying the microscope G and the illuminating means, relative to the lower base plate A, carrying the head supporting means through any distance up to a maximum displacement somewhat exceeding the average separation of the eyes.

The aperture means comprises two transparent discs Q and $Q^1$ each having a number, say eight, of graticule patterns in angularly spaced relationship. Each disc Q or $Q^1$ is clamped between a pair of covering glasses $Q^2$ by a retaining ring $Q^3$.

These two graticule assemblies are mounted one above the other for independent rotation about a common axis parallel to but spaced from the optical axis, so that any one of the differing graticule patterns on each disc Q or $Q^1$ can be brought into an operative position on the optical axis such position being indicated at $Q^4$ for the upper disc Q and $Q^5$ for the lower disc $Q^1$. Proper location of the graticule in the operative position is effected by means of a pair of spring detents $Q^6$, one for each graticule assembly. The two graticule assemblies are respectively carried by a pair of aligned spindles $Q^7$, the spindle for the upper disc Q being mounted on bearings $Q^{11}$ in an upper portion of the casing intermediate part $H^1$ and the spindle for the lower disc $Q^1$ being mounted on bearings $Q^{12}$ in a lower portion of such casing intermediate part. By means of a peripheral clamping ring $H^3$, the upper and lower portions of the casing intermediate part $H^1$ can be separated to permit removal of the two graticule assemblies, for example to permit either one or both of the transparent discs Q and $Q^1$ to be replaced by an alternative disc or alternative discs bearing a different selection of graticule patterns. Each graticule assembly projects at a portion of its periphery through the clamping ring $H^3$ to enable such assembly to be rotated by finger control, the outer surface of each retaining ring $Q^3$ being serrated for this purpose.

Each graticule pattern on each disc Q or $Q^1$ consists of a photograph, at an appreciably reduced scale, of a relatively large master graticule pattern. Some of the graticules may be photographic reductions of a single master graticule pattern, differing only in respect of the orientation and position of such pattern in the field. However, in all cases, the position and orientation that the pattern will occupy in the field when the graticule is in the operative position ($Q^4$ or $Q^5$) on the optical axis is predetermined. Precise knowledge of this position and orientation of the pattern in the field is very valuable for the many aspects of ophthalmic examination. In conjunction with this, the use of photographic reductions for constituting the graticules facilitates the formation of an illuminating beam with very sharply defined edges, for small irregularities in the edges of the master graticule pattern become negligible at the reduced scale. An illuminating beam with precisely defined edges is extremely advantageous in ophthalmic examination, in conjunction with knowledge of the precise position and orientation of such beam within the field covering the whole eye.

The use of this form of aperture means also permits a wider range of differing graticules to be readily available than has hitherto been possible. Thus, for the many aspects of ophthalmic examination, a very wide variety of apertures is preferably provided, as indicated by the examples of graticule assembly shown in FIGURES 3 and 4. In these figures, FIGURE 3 may be considered as representing the upper graticule assembly incorporating the disc Q, and FIGURE 4 may be considered as representing the lower graticule assembly incorporating the disc $Q^1$. In each figure, the locating points for engagement with the appropriate spring detent $Q^6$ are indicated at $Q^8$. There are eight locating points $Q^8$ for each graticule assembly, one for each graticule pattern on the transparent disc Q or $Q^1$ incorporated in such assembly, but which locating point $Q^8$ is individually associated with each graticule is dependent on the angular relationship between the position of the detent $Q^6$ and operative graticule position ($Q^4$ or $Q^5$) on the optical axis.

For convenience, the graticules are individually indicated by the references $R^1$ to $R^8$ in FIGURES 3 and $S^1$ to $S^8$ in FIGURE 4. One graticule position on each disc Q or $Q^1$ is occupied by a circular aperture or very large pinhole, $R^1$ on the disc Q and $S^6$ on the disc $Q^1$. When such aperture $R^1$ or $S^6$ on one of the discs Q or $Q^1$ is located in the operative position ($Q^4$ or $Q^5$) on the optical axis, it transmits substantially the whole of the illuminating beam and renders operative only that graticule on the other disc which is at that time located in the operative position. The total number of individual graticule patterns available with the above-described arrangement is thus fourteen, but a considerable further number of aperture shapes are available by using various combinations of two graticule patterns, one on the disc Q and one on the disc $Q^1$.

The graticule patterns shown on the disc Q (FIGURE 3) and the disc $Q^1$ (FIGURE 4) are examples of many which may be provided. The graticules shown on the disc Q consists of a large pinhole ($R^2$), a medium sized pinhole ($R^3$), a small pinhole ($R^4$), a radial row of pinholes ($R^8$), a bar permitting illumination of the whole eye except for a slit-shaped section ($R^5$), an opaque spot with a light-transmitting surround ($R^6$) and a radial row of opaque spots ($R^7$). Analogous alternative patterns which may be provided include two or more pinholes or opaque spots of various sizes at various positions within the field, and two or more opaque bars of various widths either parallel or at an angle with one another and at various orientations within the field. The graticules shown on the disc $Q^1$ consist of single radial slits of various widths ($S^1$ to $S^3$), a group of three parallel radial slits ($S^4$), an inclined slit ($S^5$), and two patterns indicative of the wide variety of geometrical or free-hand shapes that may be provided for tests specifically suited to individual patients. The two patterns shown consist of concentric light-transmitting circular slits ($S^7$) and a grid of light-transmitting intersecting slits ($S^8$). Analogous patterns which may be provided include two or more slits of various widths either parallel or at an angle with one another and at various orientations within the field, and specifically designed patterns in which the slits or lines are opaque relative to a light-transmitting background. By rendering simultaneously operative the appropriate pinhole ($R^1$ or $R^2$ or $R^3$ or $R^4$) in the disc Q and the appropriate slit or slits ($S^1$ or $S^2$ or $S^3$ or $S^4$ or $S^5$) in the disc $Q^1$, aperture slits of various lengths are available.

It is clearly impracticable to provide for many of these different types of aperture with mechanical aperture-forming means, as in hitherto known slit lamps. Furthermore, for some purposes it is desirable to provide for illumination of the whole eye with intensity varying over the various parts of the field, and this also may be achieved by the use of the photographic graticule.

It will be appreciated that the above described arrangement may be modified in various ways within the scope of the invention, in particular with regard to the manner in which provision is made for interchange of the differing graticules. For example, instead of employing one or more rotatable discs or assemblies to carry such graticules, the carrier or carriers may be in the form of a slide or slides transversely movable across the optical axis of the illuminating means. Yet again, the differing graticules may be carried by one or more film strips movable through a gate located on the optical axis of the illuminating means.

What we claim as our invention and desire to secure by Letters Patent is:

1. Optical slit lamp apparatus for the examination of the human eye, comprising means selectively for illuminating an object position at which the eye is located and including at least two carriers supporting a number of photographically produced graticules each having light transmitting areas which differ from those of the other graticules in light-transmitting quality and consisting of a photograph at an appreciably reduced scale of a relatively large master graticule pattern, a source of light for illuminating a graticule and an optical objective for focussing an image of that graticule on the object position, a microscope for observing the object position, means for mounting the illuminating means and the microscope to permit each to move independently of the other, whereby the eye in the object position can be illuminated and viewed along various directions, means for movably supporting the graticule carrier and means for locating the graticule carriers in any one of a number of positions, whereby at least two of said graticules, one in each carrier, may be simultaneously located in an operative position in which its image is focussed on the object position, each carrier consisting of a rotatable disc bearing the differing graticules in spaced angular positions thereon and being provided with an aperture which may be located in said operative position and which, when so located, acts to transmit substantially the whole of the illuminating beam.

2. Optical slit lamp apparatus as claimed in claim 1, in which at least one of the graticules supported by at least one of the carriers consists of a light-transmitting slit of predetermined width.

3. Optical slit lamp apparatus as claimed in claim 1, in which at least one of the graticules supported by one of the carriers consists of a number of light-transmitting slits arranged in a predetermined pattern.

4. Optical slit lamp apparatus as claimed in claim 1, in which at least one of the graticules supported by one of the carriers consists of an opaque spot with a light-transmitting surround.

References Cited

UNITED STATES PATENTS

| | | | |
|---|---|---|---|
| 1,631,329 | 6/1927 | Patterson | 351—16 |
| 2,370,514 | 2/1945 | Arnesen | 351—12 |
| 2,413,600 | 12/1946 | Bierman. | |
| 2,999,422 | 9/1961 | Papritz | 351—14 |
| 3,035,483 | 5/1962 | Andreas et al. | 351—16 X |
| 3,131,695 | 5/1964 | Keeler | 351—16 X |

OTHER REFERENCES

Geiser, "Modern Techniques of Producing Precision Scales and Recticles," Photographic Engineering, vol. 4, No. 1, 1953, pp. 1–11.

DAVID SCHONBERG, Primary Examiner

P. R. GILLIAM, Assistant Examiner